No. 749,143. PATENTED JAN. 12, 1904.
C. E. ADAIR.
EGG TRAY FOR INCUBATORS.
APPLICATION FILED JUNE 19, 1903.
NO MODEL.
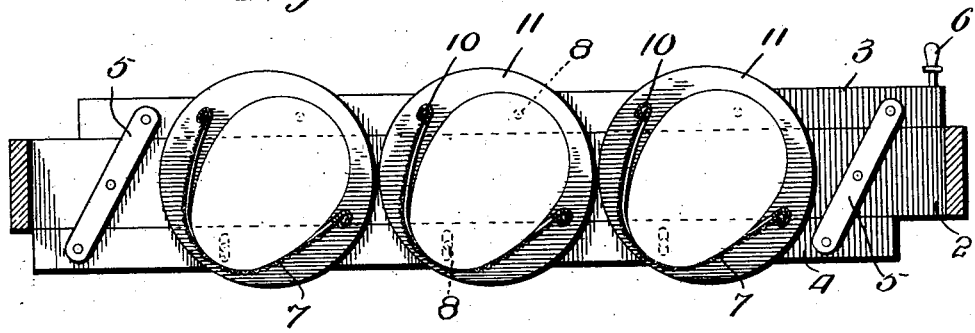
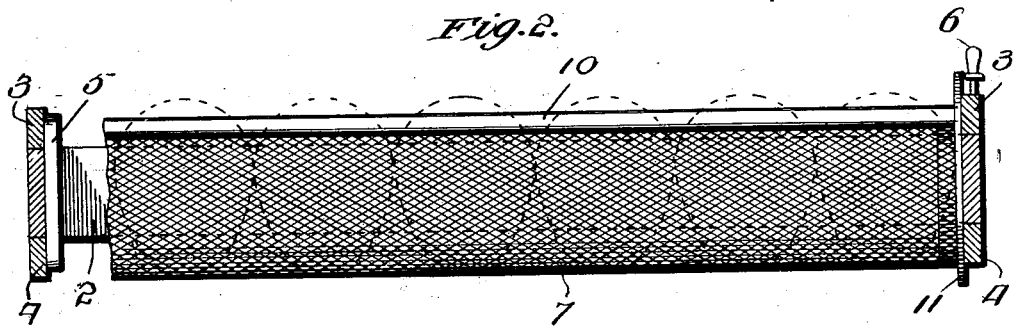
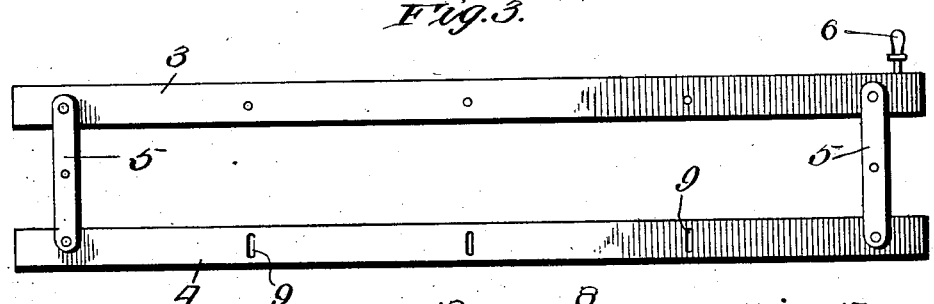
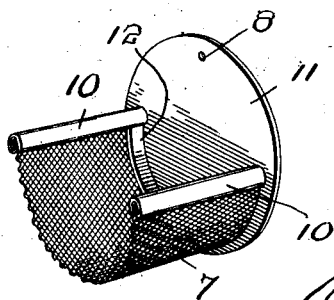
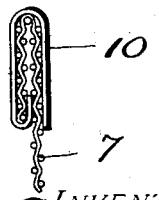

No. 749,143. Patented January 12, 1904.

UNITED STATES PATENT OFFICE.

CHARLES E. ADAIR, OF COLUMBUS, OHIO, ASSIGNOR TO EVAN J. JONES AND WILLIAM E. JONES.

EGG-TRAY FOR INCUBATORS.

SPECIFICATION forming part of Letters Patent No. 749,143, dated January 12, 1904.

Application filed June 19, 1903. Serial No. 162,275. (No model.)

*To all whom it may concern:*

Be it known that I, CHARLES E. ADAIR, a citizen of the United States, residing at Columbus, in the county of Franklin and State of Ohio, have invented certain new and useful Improvements in Egg-Trays for Incubators, of which the following is a specification, reference being had therein to the accompanying drawings.

The present invention relates to an improvement in egg-trays for incubators, and has for its object to provide an effective and simple device in which the eggs can be carried and so supported that they may be readily and conveniently turned during incubation, such turning being necessary to the hatching of the eggs, without jarring the eggs to an injurious extent or changing the general position of the eggs, so that the small ends of the eggs will always be held below the large ends thereof, this being essential for successful incubation.

That the invention may be readily understood by those skilled in the art I have illustrated one embodiment thereof in the accompanying drawings, in which—

Figure 1 is a longitudinal sectional view of an egg-tray constructed in accordance with my invention. Fig. 2 is a transverse sectional view of the tray. Fig. 3 is a detail view of the egg-trough carrier detached from the tray-frame. Figs. 4 and 5 are detail views of one end of an egg-trough, showing the end cap and trough construction.

Referring to the drawings by numerals, like numbers indicating like parts throughout the specification, 2 indicates the tray-frame, which, as shown, is a rectangular open frame of suitable material and such shape as will adapt it to be slipped into place in the incubator. Mounted upon said frame 2 is the egg-trough carrier, which comprises the upper and lower bars 3 and 4, said bars being connected at their ends by means of links 5. The said links 5 are pivoted midway their lengths to the inner sides of the side members of the tray-frame 2, so that the trough-carrier bars 3 and 4 can be moved from one extreme position, as shown in Fig. 1, to an opposite position, said bars 3 and 4 when in either one of their extreme positions lying against and in a plane with the upper and lower edges of the side members of the tray-frame 2, as clearly shown in Fig. 1. The upper member 3 of the trough-carrier may be provided with an operating-handle or finger-piece 6, by means of which the trough-carrier bars may be thrown to their different positions and the egg-troughs turned.

The egg-troughs 7, a detailed description of which will be given hereinafter, are secured by means of pivot-pins 8, passing through the upper and lower sides, respectively, of their end caps to the trough-carrier bars 3 and 4, so that as the bars are shifted positive turning movements are imparted to the series of egg-troughs, and the eggs contained therein will be turned, the angular movement of the troughs and the eggs therein depending upon the length of the links 5, which connect the carrier-bars 3 and 4. In order to permit the carrier-bars to move and spread during shifting of the egg-troughs 7, the lower bar 4 is provided with transverse slots 9, through which the lower pivot-pins 8 of the end caps pass, and as the carrier-bars move away from or toward each other in passing from one extreme position to the other the lower pivot-pins 8 of the end caps will ride back and forth in the slots 9, and free movement of the bars is thus permitted.

By providing the two carrier-bars and securing the egg-troughs to said carrier-bars rather than to the tray-frame 2 the entire weight of the egg-trays is supported on the pivots of the links 5, and the egg-troughs being secured at top and bottom to the carrier-bars are moved or turned with greater ease and with less jarring action on the eggs than where the troughs are pivoted individually to the egg-tray frame, as has been proposed heretofore. Furthermore, by this construction the trough-carrier and troughs may be readily applied to or removed from the egg-tray frame 2, and the friction of the end caps against the sides of the egg-tray frame is entirely avoided, so that the likelihood of the parts catching during shifting and imparting an injurious jerking or jostling of the eggs is completely obviated.

The egg-troughs 7 are constructed of foraminous material, preferably wire-netting, to permit free circulation of air, said wire-netting having turned or bent over edges and being bound at its edges by U-shaped metal strips 10, (see Fig. 4,) which U-shaped metal strips are folded and have one leg turned under the bent-over edges of the wire-netting. The bound edges being pinched together, the turned-under U-shaped strip 10 is positively secured in place by the turned-under leg, and the edges of the troughs 7 are effectively covered, while the metal strips 10 give rigidity and the requisite stiffness to the trough. The end caps 11 of the troughs 7 are preferably formed of metal and have inwardly-projecting flanges or rims 12, which are secured in any suitable manner to the ends of the troughs 7, as shown in Fig. 3.

From the foregoing it will be seen that I have provided an incubator egg-tray which is simple in construction, which facilitates the manipulation and turning of the eggs, and which effectually guards against injurious jostling or disarrangement of the eggs during the period of incubation because of such manipulation.

Having thus described my invention, I claim and desire to secure by Letters Patent—

1. In an egg-tray for incubators, the combination with a tray-frame, of carrier-bars, links connecting said carrier-bars pivoted on said tray-frame, and egg-troughs pivoted to said carrier-bars.

2. In an egg-tray for incubators, the combination with a tray-frame, of carrier-bars, end links connecting said carrier-bars pivoted to the inner side of the tray-frame side members, and egg-troughs pivoted at their tops and bottoms respectively to said carrier-bars.

3. In an egg-tray for incubators, the combination with a tray-frame, of carrier-bars, end links connecting said bars and pivoted to the inner sides of the side members of said tray-frame, and egg-troughs pivoted at top and bottom respectively to said carrier-bars, one of said carrier-bars having transverse slots through which the egg-trough pivot-pins pass.

In testimony whereof I affix my signature in presence of two witnesses.

CHARLES E. ADAIR.

Witnesses:
  G. E. BIBBEE,
  J. W. MOONEY.